Patented June 9, 1953

2,641,609

UNITED STATES PATENT OFFICE 2,641,609

THERAPEUTIC COMPOUND AND METHOD OF PREPARING THE SAME

Richard U. Schock, Jr., Waukegan, and Donalee L. Tabern, Lake Bluff, Ill., assignors to Abbott Laboratories, North Chicago, Ill., a corporation of Illinois No Drawing. Application May 11, 1950, Serial No. 161,466

11 Claims. (Cl. 260—479)

This invention relates to a therapeutic compound which has been found to be unexpectedly useful as a hyaluronidase inhibitor, and which has shown indication of being an anti-arthritic agent, particularly in the treatment of rheumatoid arthritis. More particularly, the invention relates to the compound 2,3,5-trihydroxybenzoic acid having the following structural formula:

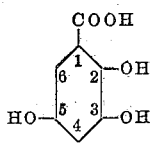

its triacyl esters, said acyl groups containing up to and including four carbon atoms, and salts of this acid and its esters.

The present invention is the result of a research investigation seeking a therapeutic agent for the treatment of arthritis. Arthritis, and particularly rheumatoid arthritis, is one of the most painful and most insurmountable afflictions facing the medical profession. During this investigation, a multitude of chemical compounds were prepared and tested. It has been postulated by the medical profession that arthritis may be caused by the presence of large concentrations of enzyme hyaluronidase in the joints of the human body.

Hyaluronic acid is a mucopolysaccharide acid which in animal joints seems to hold water in interstitial spaces. It is also believed to be essential in holding cells together. This phenomenon is believed due to gel formation by the acid which serves as a cement-like material. It is believed to serve as a lubricant and shock absorber in animal joints. This acid is also believed to play a part in preventing bacterial infection. Thus, it can be seen that hyaluronic acid is a very important chemical to the human body. Without it, the functions of parts of the body would not be performed properly. Therefore, any force which will decrease the quantity or decrease the aggregation of hyaluronic acid, becomes of importance to the medical profession. Hyaluronidase is an enzyme which deaggregates and depolymerizes hyaluronic acid. It is believed that the deaggregation is effected by eliminating secondary bonds between polysaccharide molecules or between protein and polysaccharide molecules. Thus it is important to inhibit the action of hyaluronidase and permit the hyaluronic acid to perform its functions in the body unimpaired. This enzyme is found in various parts of the human body and while the chemical structure of the enzyme and hyaluronic acid is unknown, there are several methods of analysis available for determining the amounts of these compounds. For methods of analysis and for a review article of the nature of these substances, see the article by Meyer in Physiological Reviews, vol. 27, pages 335–357 (July 1947).

The preparation of 2,3,5-trihydroxybenzoic acid presented a difficult problem. We have, after making a number of approaches to the problem, discovered that several novel and unusual methods of synthesis are available. The examples which follow not only illustrate these methods of synthesis, but also satisfy the requirements of proof of structure of the 2,3,5-trihydroxybenzoic acid formed. Inasmuch as the same compound is prepared by each of several of these processes of preparation, it will be obvious to the organic chemist that the structure assigned to this compound is the correct one.

In order to more clearly disclose the nature of the present invention, several specific examples illustrating the preparation of this compound by the various processes we have discovered will hereinafter be described. It should be understood, however, that this is done solely by way of example, and is intended neither to deviate the scope of the invention nor limit the ambit of the appended claims.

EXAMPLE I

*Preparation of 2,3,5-trihydroxybenzoic acid from salicylic acid*

To a solution of about 138 g. of salicylic acid (1 mole) and 560 g. of sodium hydroxide (14 moles) in 2 liters of water is added over a period of 5 hours at 20° C., a solution of 684 g. of 98% ammonium persulfate (3 moles) in 2 liters of water. After 15 hours, 1400 g. of concentrated sulfuric acid is added cautiously and the dark solution boiled for 1.5 hours with 20 g. of decolorizing carbon. The mixture is filtered and the cooled filtrate extracted with 5–600 cc. portions of butyl acetate. The extract is then treated with decolorizing carbon, filtered and concentrated at reduced pressure to a mush of crystals. Then 1 liter of n-hexane, sold commercially as Skellysolve B, is added and the solid separated by filtrating. The impure acid melted at 201° (d.). Three recrystallizations from hot water raised the melting point to 225° C. (d.).

We have observed that the presence of a large excess of alkaline persulfate is essential to shift the reaction point of equilibrium to produce larger yields of 2,3,5-trihydroxybenzoic acid. When slight excesses of persulfate are used, smaller yields of trihydroxybenzoic acid are obtained, and instead there appeared to be larger quantities of 2,5-dihydroxybenzoic acid (gentisic acid) produced. In place of ammonium persulfate, potassium persulfate or other alkaline persulfates may be used in this reaction.

EXAMPLE Ia

*Preparation of 2,3,5-trihydroxybenzoic acid from 3,5-dihydroxybenzoic acid*

To a solution of about 30.8 g. of 3,5-dihydroxybenzoic acid and 48 g. of sodium hydroxide in 300 cc. of water, is added a solution of 46.5 g. of 98% ammonium persulfate in 300 cc. of water. The temperature is maintained at 20° C. by cooling. After twenty-four hours the solution is acidified with concentrated sulfuric acid at 20° C. and then extracted with four-100 cc. portions of ether. A further 100 g. of concentrated sulfuric acid is added and the solution heated one hour on the steam bath. It is then cooled and filtered. The filtrate is extracted with four-100 cc. portions of ether; these are combined, dried and treated with decolorizing carbon. Filtration and evaporation left 6.2 g. of product which melted at 214° C. with decomposition. This product is somewhat more difficult to purify than the one obtained in Example I. However, the triacetate of the two products both melted at 132–3° C. and the mixed melting point of the two triacetates revealed no melting point depression.

EXAMPLE Ib

*Preparation of 2,3,5-trihydroxybenzoic acid from 2-hydroxy-3-methoxy benzoic acid*

To a solution containing 240 g. (6 moles) of sodium hydroxide in 1000 cc. of water was added about 168 g. (1 mole) of 2-hydroxy-3-methoxy benzoic acid. The temperature of the solution is brought to about 20° C. and a solution of 250 g. of 98% of ammonium persulfate dissolved in 1000 cc. of water is added at this temperature. At 20° C. the preparation is acidified with 300 g. of concentrated sulfuric acid. A tarry product precipitates which is separated and the solution extracted with 250 cc. portions of ether. To the aqueous layer is added 300 g. of concentrated sulfuric acid, after which it is heated on the steam bath for 2 hours. After being cooled and filtered, the filtrate is extracted with five 200 cc. portions of ethyl acetate. After being dried and treated with decolorizing charcoal, the charcoal is removed by filtration, the solution evaporated to near dryness and precipitated with normal hexane. A tan product having a melting point of 238° C., with decomposition is obtained after being recrystallized twice with hot water. This product is 2,5-dihydroxy-3-methoxy benzoic acid.

The product obtained above is boiled in the amount of 8.0 g. in 50 cc. of 48% hydrobromic acid for three hours. The mixture is diluted with an equal volume of water and continuously extracted with ether for about 16 hours. The ether extract is dried over magnesium sulfate and treated with decolorizing charcoal. After removing the charcoal and magnesium sulfate by filtration, the ether extract is evaporated to dryness. A light tan solid having a melting point of 224° C., with decomposition, which is the same as the product obtained in Example 1, indicating that the resulting product is 2,3,5-trihydroxy benzoic acid.

EXAMPLE II

*Preparation of 2,3,5-tripropionoxybenzoic acid*

Approximately 0.5 g. of 2,3,5-trihydroxybenzoic acid is dissolved in 5 cc. of propionic anhydride and a drop of sulfuric acid added. The mixture is heated on a steam bath for 15 minutes, following which it is poured into 30 cc. of warm water. The crystals which form are recrystallized from dilute acetic acid and have a melting point of 143–4° C.

EXAMPLE IIa

*2,3,5-triacetoxybenzoic acid*

Approximately 0.5 g. of 2,3,5-trihydroxybenzoic acid is dissolved in 5 cc. of acetic anhydride and a drop of sulfuric acid added. The mixture is heated on a steam bath for 15 minutes, following which it is poured into 30 cc. of warm water. The crystals which form are recrystallized from dilute acetic acid and have a melting point of 142–3° C. A mixed melting point of this product with 2,3,5-tripropionoxybenzoic acid revealed a 10° depression in melting point.

Triacyl derivatives of 2,3,5-trihydroxybenzoic acid have been found to demonstrate desirable properties wherein the acyl group contains up to and including four carbon atoms each. For example, when butyric anhydride is used, the compound 2,3,5-tributyroxybenzoic acid is obtained. The triacyloxyesters may also be prepared by esterifying 2,3,5-trihydroxybenzoic acid with the desired acid chloride.

EXAMPLE III

*Monosodium salt of 2,3,5-trihydroxybenzoic acid*

To a solution of about 40 g. of 2,3,5-trihydroxybenzoic acid in 100 cc. of dry methanol is added a solution of 6 g. of sodium in 150 cc. of methanol. The resultant neutral solution is added slowly with agitation to 500 cc. of dry ether. Filtration produced a light tan solid material completely soluble in water.

It has been found desirable to administer the 2,3,5-trihyroxybenzoic acid and its acyl derivatives in the form of salts such as the above sodium salt. Any metallic ion which is non-toxic and which forms a water soluble product is suitable. We have found the sodium salt to be the most satisfactory of the salts; however, the potassium and calcium salts as well as the ammonium salts have been found to be about as satisfactory. In general it may be said that the alkali metal salts are the preferred salts. In this application the term metallic ion is intended to include the ammonium ion. These salts may be prepared by treating the acid or its acyl derivative with a salt of the above mentioned cations.

The 2,3,5-trihydroxybenzoic acid, its triacyl derivatives and the salts of these compounds may be administered to the patient in various ways. They may be administered orally as a powder in the form of capsules or in the more convenient form of tablets. The following example will illustrate the method of preparation of a suitable one gram tablet of 2,3,5-trihydroxybenzoic acid.

EXAMPLE IV

| Formula for 100 tablets: | Grams |
|---|---|
| 2,3,5-trihydroxybenzoic acid | 100 |
| Lactose | 12.5 |
| Corn starch | 2.0 |
| Talc | 1.5 |
| Magnesium stearate | 0.5 |
| Corn starch, dried | 6.0 |

The tablets are prepared by mixing the 2,3,5-trihydroxybenzoic acid with lactose, screening, and moistening slightly. This mixture is granulated with a corn starch paste made by dissolving 2 gms. of corn starch in 20 cc. of water with heat. After completion of the granulation, the preparation is dried thoroughly at 100° F. To this granulation is added the talc, magnesium stearate and the 6 gms. of dried corn starch. After thoroughly mixing, the tablets are compressed in a conventional tablet machine.

Also, aqueous solutions suitable for oral use or for injection may be prepared in stable form by dissolving salts such as the sodium salt in sterile water and maintaining the space above the liquid level free from air.

Others may readily adapt the invention for use under various conditions of service, by employing one or more of the novel features disclosed, or equivalents thereof. As at present advised with respect to the apparent scope of our invention, we desire to claim the following subject matter.

We claim:

1. A compound selected from the class consisting of 2,3,5-trihydroxybenzoic acid, a 2,3,5-trialkacyl ester of 2,3,5-trihydroxybenzoic acid, said acyl group containing up to and including four carbon atoms, and their water-soluble salts of a non-toxic metal selected from the class consisting of alkali metal, alkaline earth metal, and the ammonium ion.

2. A compound according to claim 1 wherein the non-toxic metal is an alkali metal.

3. A compound according to claim 1 wherein the non-toxic metal is sodium.

4. The compound 2,3,5-trihydroxybenzoic acid.

5. The monosodium salt of 2,3,5-trihydroxybenzoic acid.

6. The compound 2,3,5-tripropionoxybenzoic acid.

7. The compound 2,3,5-triacetoxybenzoic acid.

8. The process of producing 2,3,5-trihydroxybenzoic acid which comprises the treatment of salicylic acid with an alkaline persulfate.

9. The process according to claim 8 in which the persulfate ion is present in a substantial excess.

10. The process for the preparation of 2,3,5-trihydroxybenzoic acid which comprises the treatment of 3,5-dihydoxybenzoic acid with alkaline persulfate.

11. The process of producing 2,3,5-trihydroxybenzoic acid which comprises oxidation of 2-hydroxy-3-methoxybenzoic acid by alkaline persulfate to produce 2,5-dihydroxy-3-methoxybenzoic acid; followed by cleavage of the methoxyl group with hydrobromic acid.

RICHARD U. SCHOCK, Jr.
DONALEE L. TABERN.

References Cited in the file of this patent

UNITED STATES PATENTS

| Number | Name | Date |
|--------|------|------|
| 671,769 | Lederer | Apr. 9, 1901 |
| 2,400,433 | Natelson | May 14, 1946 |

OTHER REFERENCES

Faltis:Monatshefte, 53/54, 633–634 (1929).
Beilstein: Col. 10, 2nd supplement, p. 333 (1949).